(12) United States Patent
Hayakawa et al.

(10) Patent No.: US 6,758,589 B2
(45) Date of Patent: Jul. 6, 2004

(54) HEADLAMP FOR VEHICLE

(75) Inventors: Michihiko Hayakawa, Shizuoka (JP); Naoki Uchida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 17 days.

(21) Appl. No.: 10/170,372

(22) Filed: Jun. 14, 2002

(65) Prior Publication Data

US 2002/0191413 A1 Dec. 19, 2002

(30) Foreign Application Priority Data

Jun. 19, 2001 (JP) .................................. P.2001-184250

(51) Int. Cl.$^7$ .......................................... F21W 101/10
(52) U.S. Cl. ..................... 362/539; 362/512; 362/538; 362/544
(58) Field of Search ................................ 362/544, 543, 362/539, 538, 512, 507

(56) References Cited

U.S. PATENT DOCUMENTS

| | | | |
|---|---|---|---|
| 6,511,215 B2 * | 1/2003 | Hashigaya | 362/515 |
| 6,550,944 B2 * | 4/2003 | Kusagaya | 362/466 |

FOREIGN PATENT DOCUMENTS

| | | |
|---|---|---|
| JP | 9-240363 | 9/1997 |
| WO | WO 99/02917 | 1/1999 |

* cited by examiner

*Primary Examiner*—Laura K. Tso
(74) *Attorney, Agent, or Firm*—Sughrue Mion, PLLC

(57) ABSTRACT

A headlamp and method for illumination of the headlamp in which during low beam irradiation, a light distribution pattern P(L) for a low beam is formed by turning on a lighting unit for a low beam and during high beam irradiation, a lighting unit for a high beam is also turned on at the same time to superpose an additional light distribution pattern P(H1) for a high beam thereon, thereby forming a light distribution pattern P(H) for a high beam. During the high beam irradiation, furthermore, a tilting unit of the headlamp is tilted upward by approximately 1.5 degrees and a hot zone HZ(L) of the light distribution pattern P(L) for a low beam is moved to a long distance region in a road placed ahead of a vehicle, thereby enhancing a distance visibility. A central luminous intensity position M of the additional light distribution pattern P(H1) for a high beam is set to be lower than a horizontal cutoff line CL1 of the light distribution pattern P(L) for a low beam by approximately 1 degree such that it is suitable for enhancing the distance visibility during the high beam irradiation.

12 Claims, 11 Drawing Sheets

FIG. 4 (a) LOW BEAM

FIG. 4 (b) HIGH BEAM

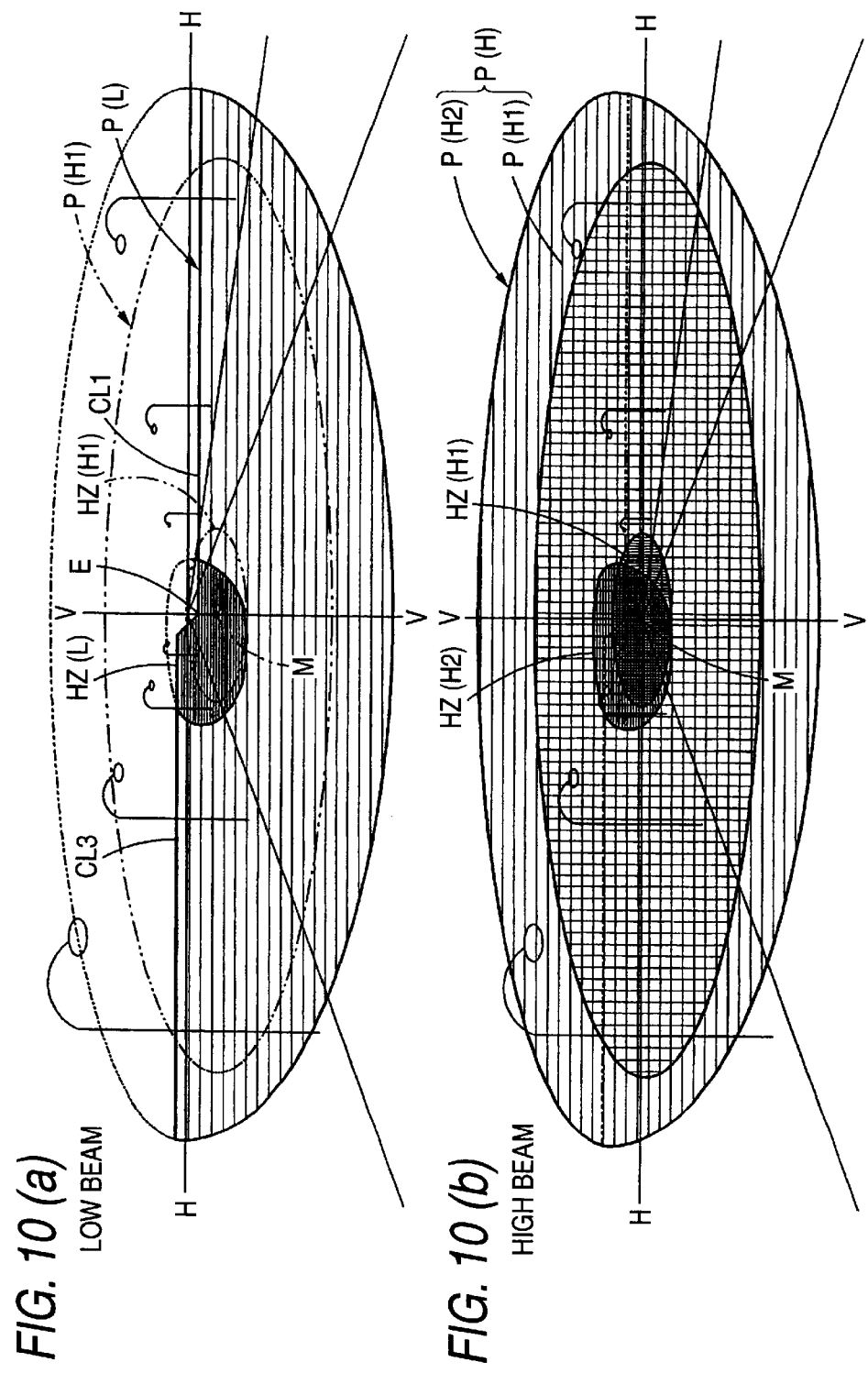
FIG. 10 (a) LOW BEAM
FIG. 10 (b) HIGH BEAM

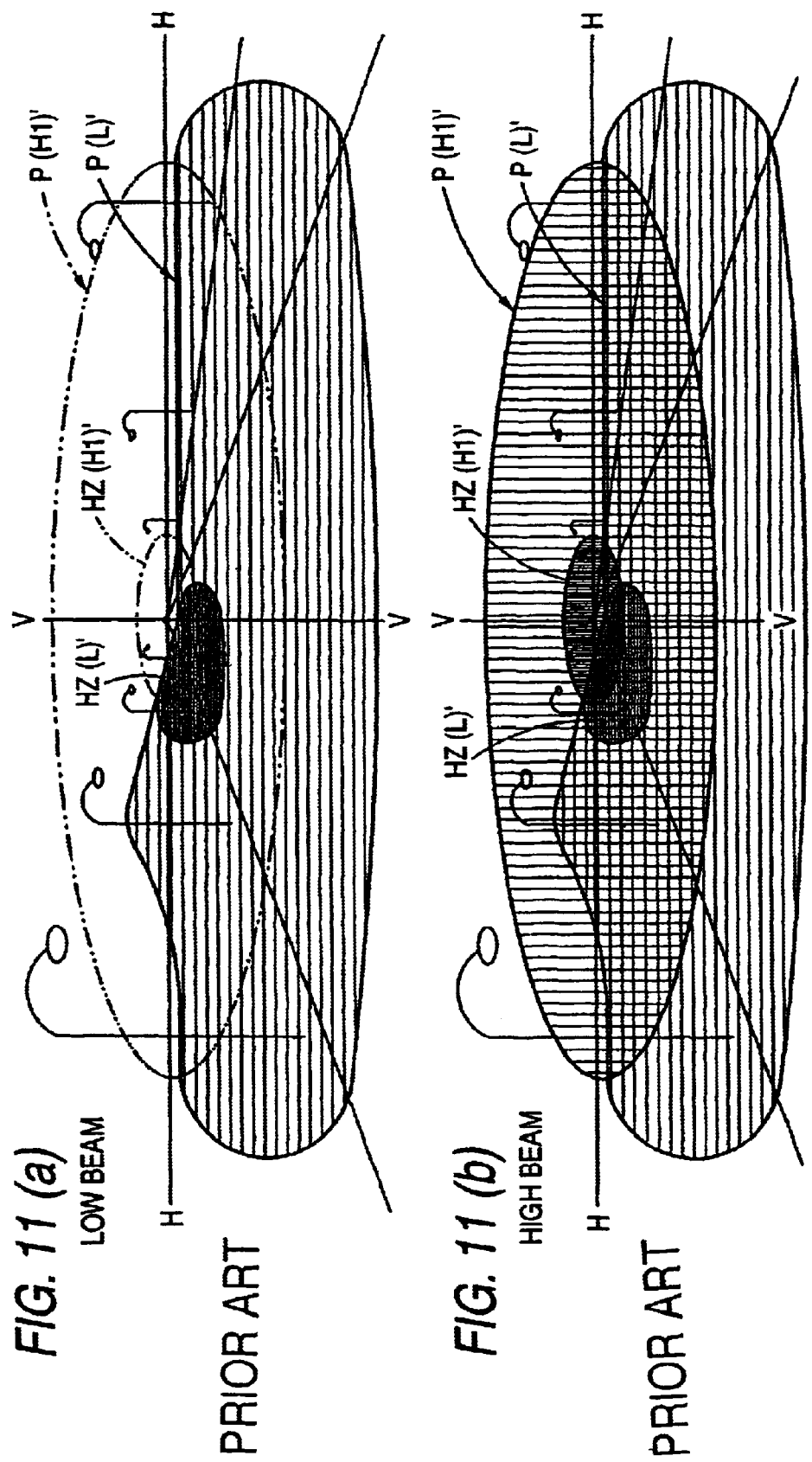
FIG. 11 (a) LOW BEAM PRIOR ART
FIG. 11 (b) HIGH BEAM PRIOR ART

HEADLAMP FOR VEHICLE

BACKGROUND OF THE INVENTION

1. Field of the Invention

The present invention relates to a headlamp for a vehicle and a method of illumination of the headlamp in which a lighting unit for a high beam and a lighting unit for a low beam are tiltably provided as one tilting unit.

2. Description of the Related Art

In the related art, a headlamp for a vehicle comprises a lighting unit for a high beam and a lighting unit for a low beam. The low beam is irradiated by turning on the lighting unit for a low beam whereas the high beam is irradiated by simultaneously turning on both of the lighting units.

In such a headlamp for a vehicle, it is hard to maintain a sufficient distance visibility during the high beam irradiation for the following reasons.

As shown in FIG. 11(a), a light distribution pattern P(L)' for a low beam, which is formed by the beam irradiation from the lighting unit for a low beam, has a hot zone (high luminous intensity region) HZ(L)' on a comparatively short distance region in a road placed ahead of a vehicle. Therefore, even if a light distribution pattern P(H1)' having a hot zone HZ(H1)' is formed on the long distance region in the road placed ahead of the vehicle by the beam irradiation from the lighting unit for a high beam, the long distance region is seen to be relatively dark due to the hot zone HZ(L)', making it hard to maintain a sufficient distance visibility.

On the other hand, when the low beam irradiation is switched to the high beam irradiation, as in a headlamp for a vehicle described in JP-A-9-240363, it is possible to enhance the distance visibility at time of the high beam irradiation if only the lighting unit for a low beam is tilted upward and the hot zone of the low beam light distribution pattern is moved to the long distance region in the road placed ahead of the vehicle.

In a headlamp for a vehicle in which a lighting unit for a high beam and a lighting unit for a low beam are tiltably provided as one tilting unit, however, there is a problem in that the lighting unit for a low beam cannot be singly tilted upward as in the headlamp for a vehicle described in JP-A-9-240363.

SUMMARY OF THE INVENTION

The present invention has been made in consideration of such circumstances and has an object to provide a headlamp for a vehicle in which a lighting unit for a high beam and a lighting unit for a low beam are tiltably provided as one tilting unit, wherein a distance visibility can be enhanced during high beam irradiation.

The invention achieves this object by devising the relationship of a beam irradiation direction between the lighting unit for a high beam and the lighting unit for a low beam.

In that regard, the invention provides a headlamp for a vehicle comprising:

a lighting unit for a high beam and a lighting unit for a low beam tiltably provided as one tilting unit, wherein low beam irradiation is performed by turning on the lighting unit for a low beam and high beam irradiation is performed by simultaneously turning on both of the lighting units, the lighting unit for a high beam set such that a central luminous intensity position of a light distribution pattern formed by the beam irradiation from the lighting unit for a high beam is lower than a horizontal cutoff line on an opposed lane side in a light distribution pattern for a low beam which is formed by the beam irradiation from the lighting unit for a low beam, and wherein the tilting unit is operable to be tilted upward at a predetermined angle at the time of the high beam irradiation.

The arrangement of each of "the lighting unit for a high beam" and "the lighting unit for a low beam" is not particularly restricted as they may be provided adjacently in a transverse direction or a vertical direction, for example.

In addition, the specific structures of "the lighting unit for a high beam" and "the lighting unit for a low beam" are not particularly restricted. For example, it is possible to use a so-called parabola type lighting unit having a reflector formed on the basis of a rotation paraboloid, or a so-called projector type lighting unit having a reflector and a projection lens which are formed to take the shape of a deformed elliptical sphere.

The specific structure of a light source for each of "the lighting unit for a high beam" and "the lighting unit for a low beam" is not particularly restricted but it maybe a discharge light emitting portion of a discharge bulb or a filament of an incandescent bulb such as a halogen bulb.

With the structure described above, it is a matter of course that the light distribution pattern formed by the beam irradiation from the lighting unit for a low beam at the time of the high beam irradiation may be maintained to be a light distribution pattern for a low beam. It is also possible to use a light distribution pattern obtained by properly moving the component of the lighting unit for a low beam during beam switching to add a predetermined light distribution pattern to the light distribution pattern for a low beam.

If the "central luminous intensity position" of the light distribution pattern for a high beam is set to be lower than the horizontal cutoff line on the opposed lane side in the light distribution pattern for a low beam, a specific position thereof is not particularly restricted but may be properly set depending on the light distribution characteristic of the light distribution pattern for a low beam.

Referring to the "predetermined angle", a specific value thereof is not particularly restricted but it may be properly set depending on the central luminous intensity position of the light distribution pattern for a high beam; for example, set to approximately 1 to 2 degrees.

With the structure described above, the headlamp for a vehicle according to the present invention is constituted such that a lighting unit for a high beam and a lighting unit for a low beam are tiltably provided as one tilting unit, and low beam irradiation is carried out by turning on the lighting unit for a low beam and high beam irradiation is carried out by simultaneously turning on both of the lighting units. A central luminous intensity position of a light distribution pattern formed by the beam irradiation from the lighting unit for a high beam is set to be lower than a horizontal cutoff line on an opposed lane side in a light distribution pattern for a low beam which is formed by the beam irradiation from the lighting unit for a low beam, and the tilting unit is constituted to be tilted upward at a predetermined angle at time of the high beam irradiation as compared with time of the low beam irradiation. Therefore, the following functions and effects can be obtained.

More specifically, the tilting unit is tilted upward at a predetermined angle during the high beam irradiation as compared with the low beam irradiation so that the light distribution pattern formed by the beam irradiation from the lighting unit for a low beam can be displaced upward at the predetermined angle. Consequently, the hot zone can be moved to a long distance region in a road placed ahead of the vehicle. Thus, it is possible to enhance a distance visibility during the high beam irradiation.

On the other hand, the central luminous intensity position of the light distribution pattern formed by the beam irradiation from the lighting unit for a high beam is set to be lower than the horizontal cutoff line on the opposed lane side in the light distribution pattern for a low beam. Therefore, when the tilting unit is tilted upward at a predetermined angle during the high beam irradiation as compared with the low beam irradiation, the central luminous intensity position of the light distribution pattern can be set to be suitable for enhancing the distance visibility.

According to the invention, therefore, it is possible to enhance the distance visibility during the high beam irradiation in the headlamp for a vehicle in which the lighting unit for a high beam and the lighting unit for a low beam are tiltably provided as one tilting unit.

While the light source for each of "the lighting unit for a high beam" and "the lighting unit for a low beam" is not particularly restricted as described above, it is particularly effective to employ a structure in which the light source of the lighting unit for a high beam is the filament of an incandescent bulb and the light source of the lighting unit for a low beam is the discharge light emitting portion of a discharge bulb.

In explanation, the discharge bulb has a higher color temperature at the time of lighting and a higher luminous flux of a light source than those of the incandescent bulb. Therefore, a light distribution pattern formed by the beam irradiation from the lighting unit for a low beam using the discharge light emitting portion of the discharge bulb as the light source is white and bright, while a light distribution pattern formed by the beam irradiation from the lighting unit for a high beam using the filament of the incandescent bulb as the light source is red and slightly dark. However, with this configuration, the long distance region of the road placed ahead of the vehicle may be seen with more difficulty at the time of the high beam irradiation in which both of the light distribution patterns are synthesized. Consequently, it is more difficult to maintain a sufficient distance visibility. Therefore, it is very effective that the light distribution pattern formed by the beam irradiation from the lighting unit for a low beam is displaced upward at time of the high beam irradiation as in the present invention.

With the structure described above, if the central luminous intensity position of the light distribution pattern formed by the beam irradiation from the lighting unit for a high beam is set to be shifted by a predetermined amount toward the opposed lane side in the forward direction of the lighting unit for a high beam, the following functions and effects can be obtained.

More specifically, the hot zone in the light distribution pattern for a low beam which is formed by the beam irradiation from the lighting unit for a low beam is generally formed in a position shifted toward the self-lane side in the forward direction of the lighting unit for a low beam. Therefore, if the central luminous intensity position of the light distribution pattern formed by the beam irradiation from the lighting unit for a high beam is set to be shifted by a predetermined amount toward the opposed lane side in the forward direction of the lighting unit for a high beam, the hot zone of the synthetic light distribution pattern (that is, the light distribution pattern for a high beam) formed by the beam irradiation from both of the lighting units can be arranged to be transversely expanded with a good balance. Thus, the distance visibility in the high beam irradiation can be enhanced even further. The specific value of the "predetermined amount" is not particularly restricted, but may be properly set depending on the arrangement and size of the hot zone in the light distribution pattern for a low beam and can be set to approximately 0.5 to 2 degrees, for example.

DETAILED DESCRIPTION OF THE INVENTION

Embodiments of the invention are described below with reference to the drawings.

A first embodiment of the invention will now be described.

Figure 1:
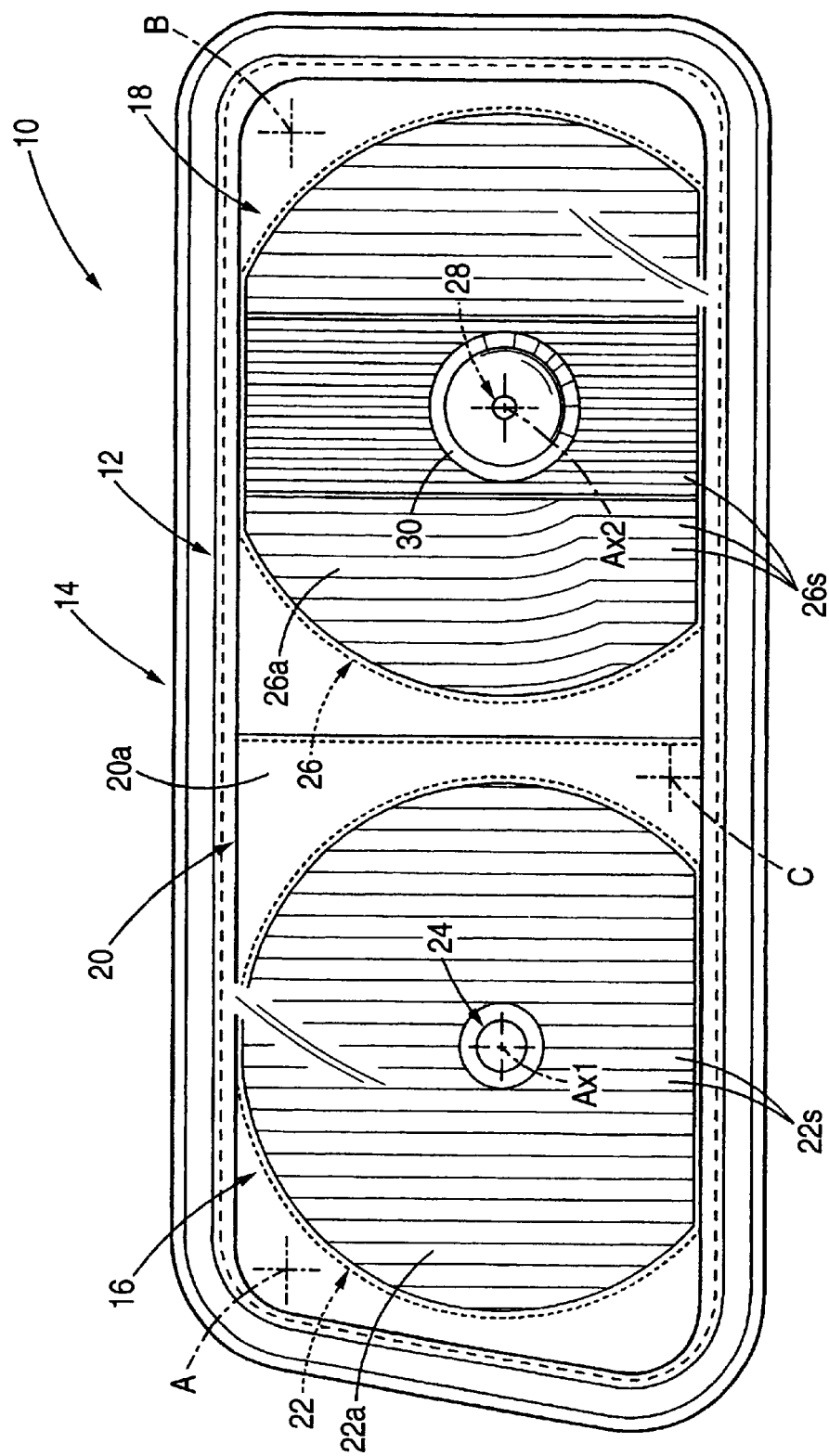
FIG. 1 is a front view showing a headlamp for a vehicle according to a first embodiment of the invention.
Figure 2:
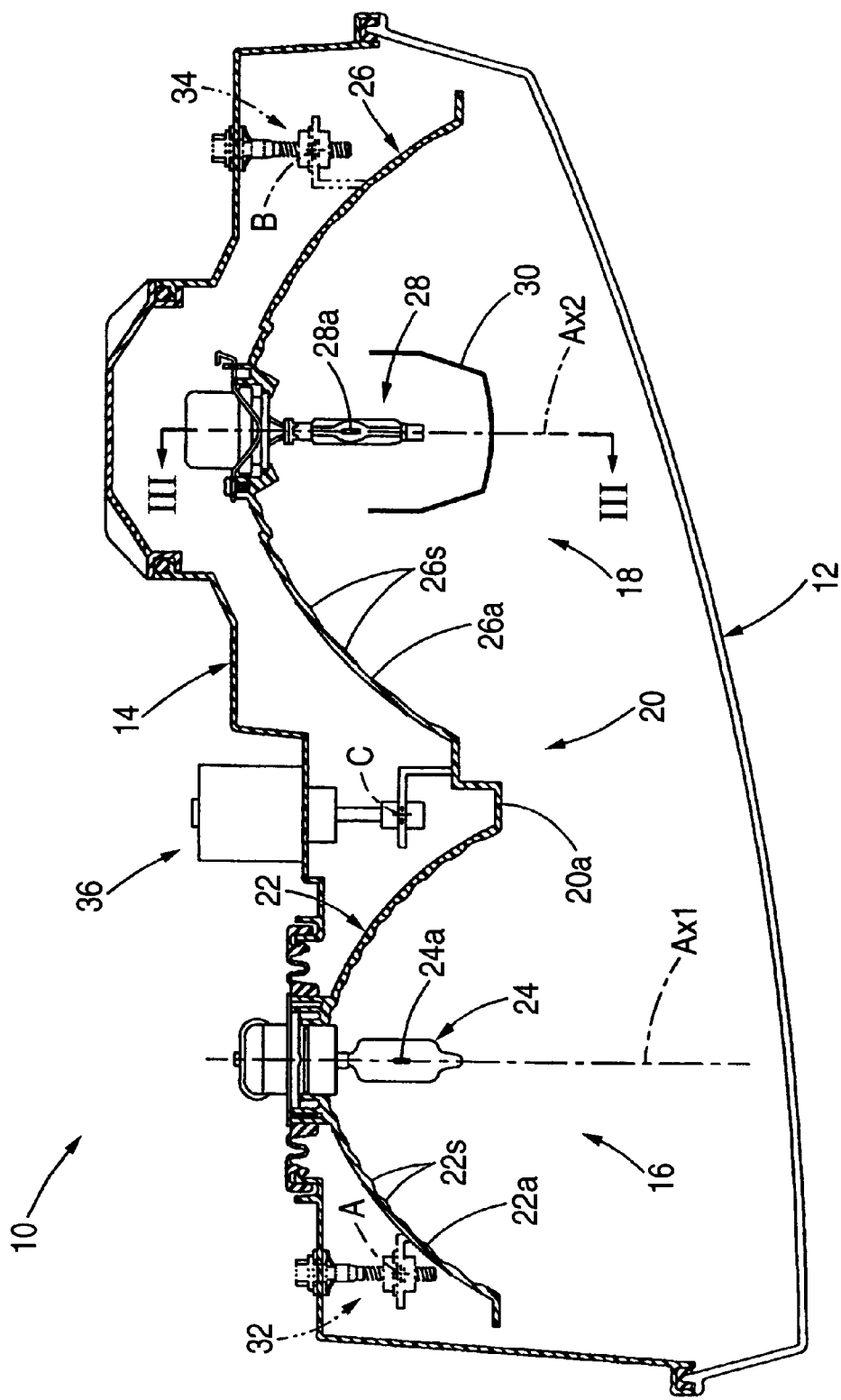
FIG. 2 is a sectional plan view showing the headlamp for a vehicle according to the first embodiment.
Figure 3:
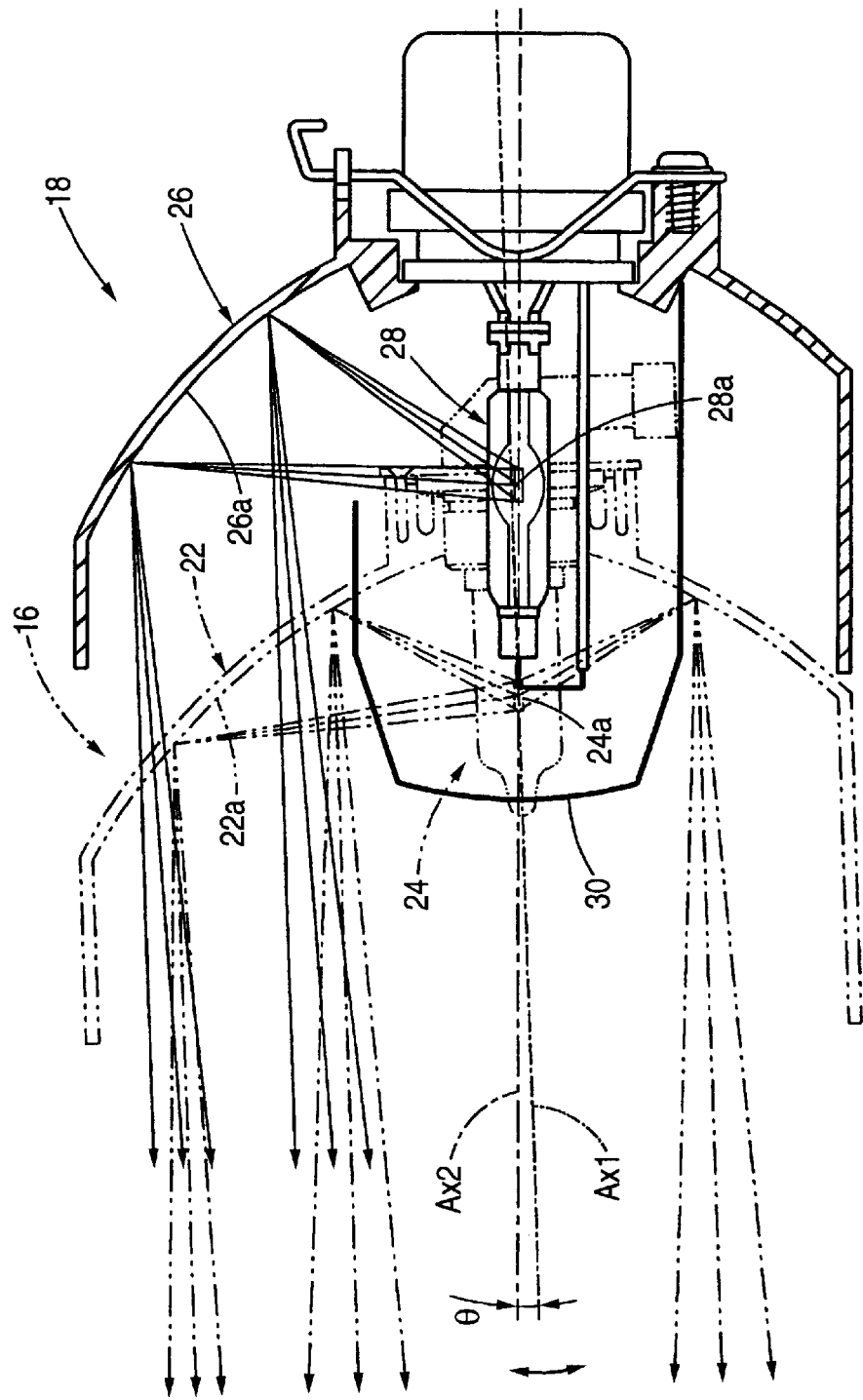
FIG. 3 is a sectional view taken along a line III—III in FIG. 2, FIGS. 4(a) and 4(b) are perspective views showing a light distribution pattern formed on a virtual vertical screen provided in a position of 25 m ahead of a lighting by beam irradiation from the headlamp for a vehicle to the first embodiment.

FIG. 1 is a front view showing a headlamp for a vehicle according to the invention and FIG. 2 is a sectional plan view thereof. Moreover, FIG. 3 is a sectional view taken along a line III—III in FIG. 2.

As shown in these drawings, a headlamp 10 for a vehicle according to the embodiment includes a lighting positioned on the left side in a pair of left and right four-lighting type headlamps provided on the front end of the vehicle. A lighting positioned on the right side of the vehicle also has the same structure.

The headlamp 10 for a vehicle has such a structure that a lighting unit 16 for a high beam and a lighting unit 18 for a low beam, which are provided adjacently in a transverse direction, are tiltably provided as one tilting unit 20 in a lamp housing formed by a transparent front cover 12 and a lamp body 14. The headlamp 10 for a vehicle serves to irradiate a low beam by turning on the lighting unit 18 and to irradiate a high beam by simultaneously turning on both of the lighting units 16 and 18.

As a non-limiting example, the lighting unit 16 for a high beam is of a parabola type and comprises a reflector 22 having an optical axis Ax1 extended downward at an angle θ (θ=approximately 1.5 degrees) with respect to an axis extended in the longitudinal direction of the vehicle and a halogen bulb 24 (an incandescent bulb) having a single filament 24a (a light source)

The halogen bulb 24 is attached to the reflector 22 to position the filament 24a onto the optical axis Ax1. The reflector 22 has a reflecting plane 22a provided with a plurality of reflecting elements 22s on a rotation paraboloid setting the optical axis Ax1 to be a central axis, and serves to forward diffuse, deflect and reflect a light transmitted from the filament 24a.

On the other hand, the lighting unit 18 for a low beam is of a parabola type and comprises a reflector 26 having an optical axis Ax2 extended in the longitudinal direction of the vehicle, a discharge bulb 28 having a discharge light emitting portion 28a (a light source) and a shade 30 attached to the reflector 26 to cover the discharge bulb 28 over a predetermined angle range.

The discharge bulb 28 is attached to the reflector 26 such that the discharge light emitting portion 28a is positioned on the optical axis Ax2. The reflector 26 has a reflecting plane 26a provided with a plurality of reflecting elements 26s on a rotation paraboloid setting the optical axis Ax2 to be a central axis, and serves to forward diffuse, deflect and reflect a light transmitted from the discharge light emitting portion 28a. The shade 30 is constituted to block light incidence from the discharge light emitting portion 28a onto the almost lower half region of the reflecting plane 26a.

The reflector 22 of the lighting unit 16 for a high beam and the reflector 26 of the lighting unit 18 for a low beam are formed integrally through a tilting unit panel 20a, thereby constituting the tilting unit 20. The tilting unit 20 is supported on the lamp body 14 through aiming mechanisms 32 and 34 on left and right upper endpoints A and B and is also supported on the lamp body 14 through a leveling mechanism 36 on a central lower end point C. The tilting unit 20 is tilted in a vertical direction around a straight line connecting the left and right upper end points A and B by the driving operation of the leveling mechanism 36.

The leveling mechanism 36 is driven in beam switching as well as normal leveling control. In the driving operation for the leveling control, the tilting unit 20 (and furthermore, the lighting unit 18 for a low beam) is tilted in a vertical direction corresponding to the running situations of a vehicle in such a manner that the low beam irradiation can be always carried out at an optimum angle with respect to a road placed ahead of the vehicle. In the driving operation of the leveling mechanism 36 for the beam switching, moreover, the tilting unit 20 is tilted upward by approximately 1.5 degrees from a reference position for the leveling control (that is, an angle which is almost equal to the angle θ) when the low beam irradiation is switched into high beam irradiation, while the tilting unit 20 is tilted downward to an original position when the high beam irradiation is switched into the low beam irradiation.

Figure 4:
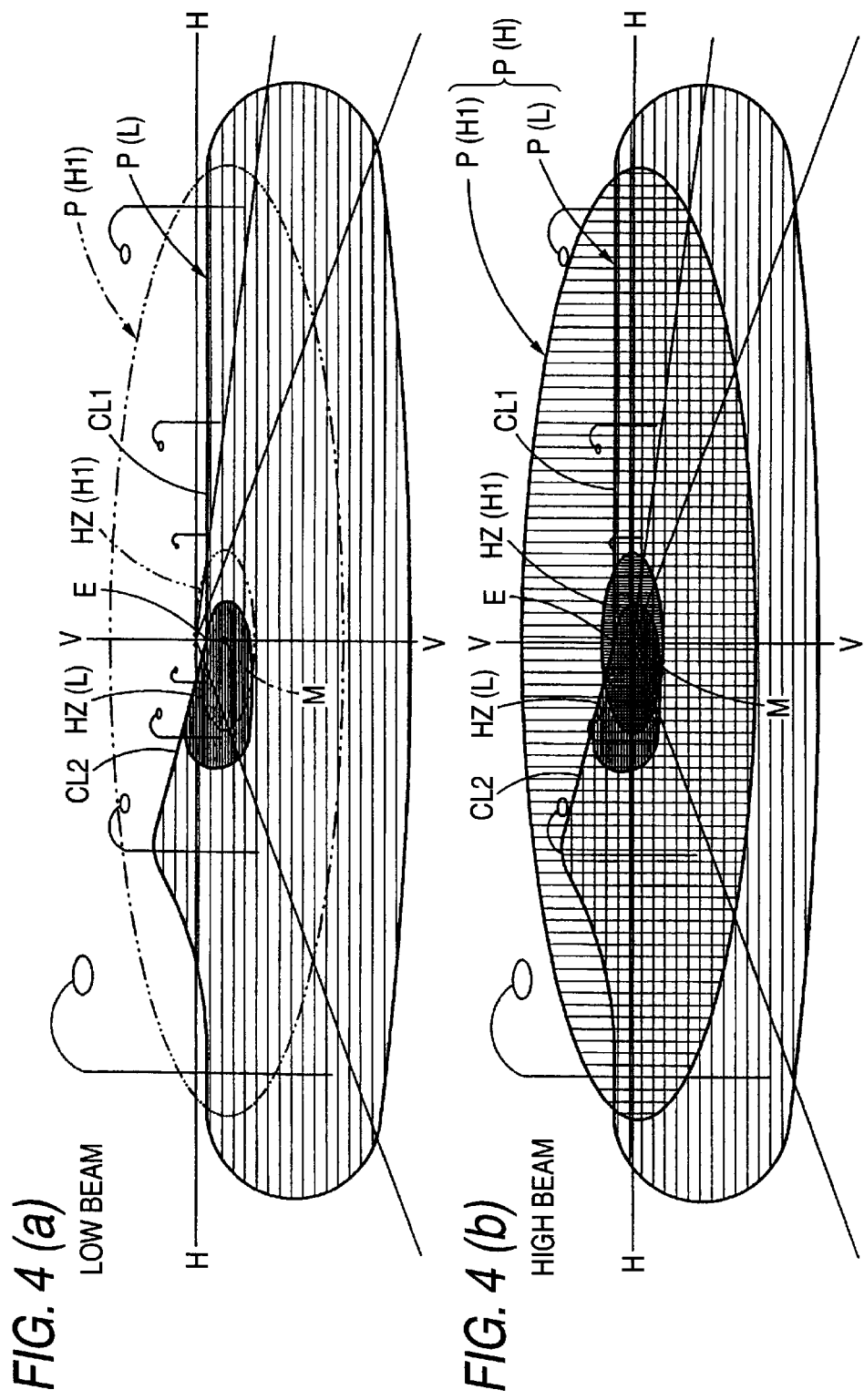

FIG. 4 is a perspective view showing a light distribution pattern formed on a virtual vertical screen provided in a position placed ahead of the lighting by 25 m through the beam irradiation from the headlamp 10 for a vehicle according to the embodiment.

The headlamp 10 for a vehicle forms a light distribution pattern P(L) for a low beam as shown in FIG. 4(a) by the beam irradiation from the lighting unit 18 for a low beam during the low beam irradiation, and forms a light distribution pattern P(H) for a high beam in which an additional light distribution pattern P(H1) is superposed on the light distribution pattern P(L) for a low beam as shown in FIG. 4(b) by the beam irradiation from both of the lighting units 16 and 18 during the high beam irradiation. As will be described below, the tilting unit 20 is tilted upward by approximately 1.5 degrees at time of the high beam irradiation as compared with time of the low beam irradiation so that the light distribution pattern P(L) for a low beam is displaced upward.

As shown in FIG. 4(a), the light distribution pattern P(L) for a low beam has a horizontal cutoff line CL1 on the opposed lane side in a lighting front direction (H–V), and furthermore, has an oblique cutoff line CL2 on the self-lane side. A hot zone HZ(L) is formed on a region in the vicinity of the lower left part of an intersection (an elbow point) E of the horizontal cutoff line CL1 and the oblique cutoff line CL2. The light distribution pattern P(L) for a low beam has the elbow point E positioned below the H–V by 0.5 to 0.6 degrees during the low beam irradiation (or in other words, in the reference position for the leveling control).

While the light distribution pattern P(L) for a low beam is displaced upward by approximately 1.5 degrees through the upward tilt of the tilting unit 20 during the high beam irradiation as shown in FIG. 4(b), the hot zone HZ(L) is also displaced upward to a height which is almost equal to an H–H line (a horizontal line passing through the H–V) by the upward displacement.

On the other hand, the additional light distribution pattern P(H1) for a high beam has a central luminous intensity position M set to the H–V and a hot zone HZ(H1) is formed around the H–V as shown in FIG. 4(b). The additional light distribution pattern P(H) for a high beam is not formed during the low beam irradiation. If the additional light distribution pattern P(H) is formed, the central luminous intensity position M is positioned below the H–V by approximately 1.5 degrees as shown in a two-dotted chain line of FIG. 4(a).

As described above in detail, the headlamp 10 for a vehicle according to the embodiment has such a structure that the lighting unit 16 for a high beam and the lighting unit 18 for a low beam are tiltably provided as one tilting unit 20, and the low beam irradiation is carried out by turning on the lighting unit 16 for a low beam and the high beam irradiation is carried out by simultaneously turning on both of the lighting units 16 and 18. The central luminous intensity position M of the additional light distribution pattern P(H1) for a high beam, which is formed by the beam irradiation from the lighting unit 18 for a high beam, is set to be lower by approximately 1 degree than the horizontal cutoff line CL1 of the light distribution pattern P(L) for a low beam which is formed by the beam irradiation from the lighting unit 16 for a low beam. In addition, the tilting unit 20 is tilted upward by approximately 1.5 degrees at time of the high beam irradiation as compared with time of the low beam irradiation. Therefore, the following functions and effects can be obtained.

When the tilting unit 20 is tilted upward by approximately 1.5 degrees at time of the high beam irradiation as compared with time of the low beam irradiation, the light distribution pattern P(L) for a low beam can be displaced upward by approximately 1.5 degrees. Therefore, the hot zone HZ(L) can be moved to the long distance region of the road placed ahead of the vehicle. Consequently, a distance visibility in the high beam irradiation can be enhanced.

On the other hand, the central luminous intensity position M of the additional light distribution pattern P(H1) for a high beam is set to be lower by approximately 1 degree than the horizontal cutoff line CL1 of the light distribution pattern P(L) for a low beam. Therefore, when the tilting unit 20 is tilted upward by approximately 1.5 degrees at time of the high beam irradiation as compared with the time of the low beam irradiation, the central luminous intensity position M of the additional light distribution pattern P(H1) for a high beam can be set suitably for enhancing the distance visibility (that is, a height which is almost equal to the H–H line).

In the headlamp 10 for a vehicle according to the embodiment, particularly, the filament 24a of the halogen bulb 24 is used for the light source of the lighting unit 16 for a high beam. Therefore, the additional light distribution pattern P(H1) for a high beam is red and slightly dark. On the other hand, since the discharge light emitting portion 28a of the discharge bulb 28 is used for the light source of the lighting unit 18 for a low beam, the light distribution pattern P(L) for a low beam is white and bright. During the high beam irradiation in which both of the light distribution patterns P(H1) and P(L) are to be synthesized, therefore, the long distance region of the road placed ahead of the vehicle may be seen with more difficulty so that it is harder to maintain a sufficient distance visibility. As in the embodiment, however, if the light distribution pattern P(L) for a low beam is displaced upward during the high beam irradiation, it is possible to effectively suppress such a situation such that the long distance region of the road placed ahead of the vehicle is easily seen.

In the embodiment, furthermore, the tilting unit 20 is tilted by controlling the driving operation of the leveling mechanism 36. Therefore, it is possible to obtain the functions and effects of the invention at a low cost.

Figure 5:
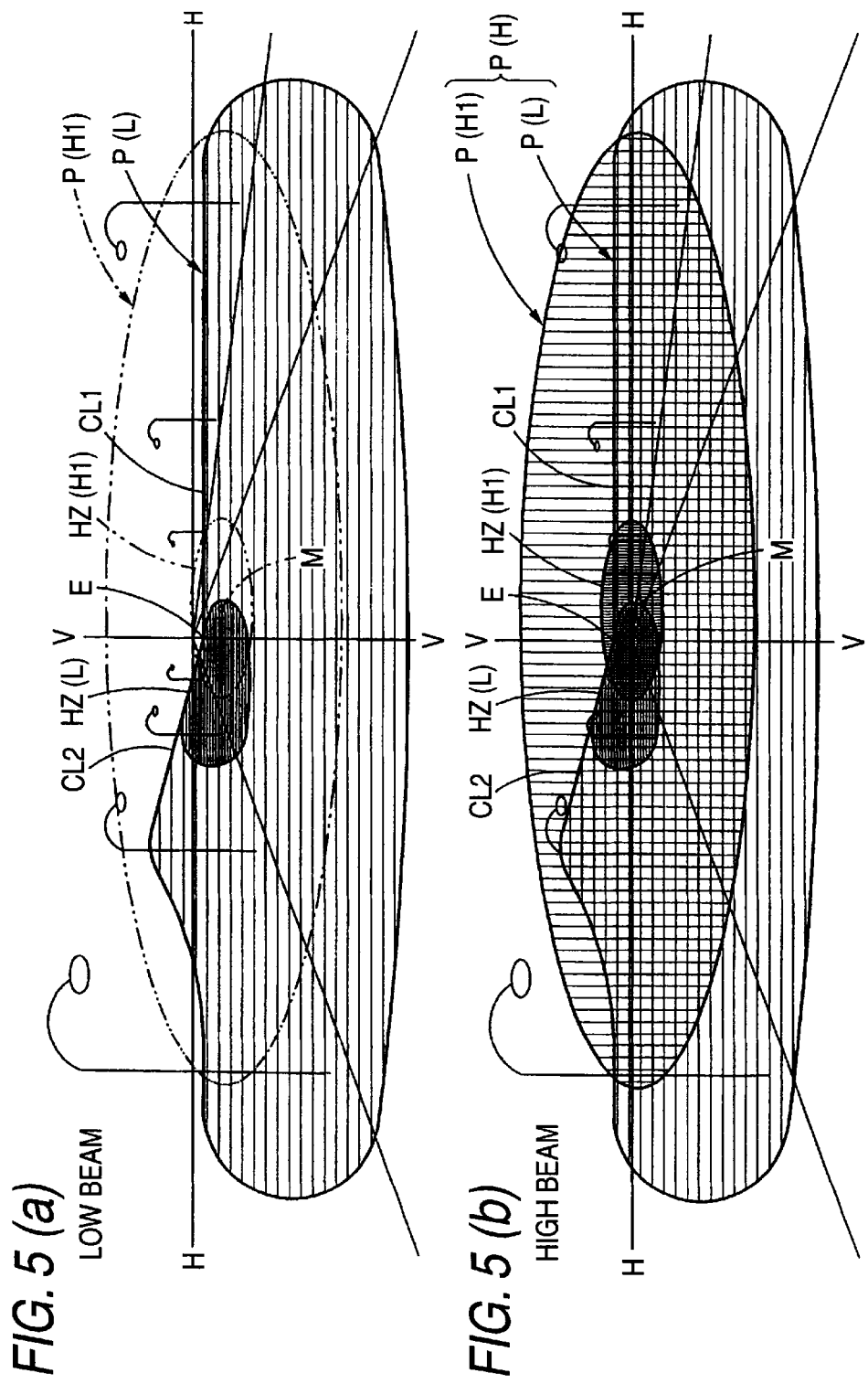
FIGS. 5(a) and 5(b) are views showing the function of a variant of the first embodiment in the same manner as FIG. 4.

In the first embodiment, the central luminous intensity position M of the additional light distribution pattern P(H1) for a high beam is set to the H–V (that is, the forward direction of the lighting unit 16 for a high beam). If the central luminous intensity position M is set to be shifted by a predetermined amount (for example, approximately 1 degree) on the opposed lane side with respect to the H–V, the hot zone HZ(H1) is also formed in a position shifted toward the opposed lane side as shown in FIG. 5. Therefore, it is possible to arrange the hot zone HZ(H1) and the hot zone HZ(L) of the light distribution pattern P(L) for a low beam which is formed in a position shifted toward the self-lane side with respect to the H–V so as to be have good balance. Consequently, the distance visibility in the high beam irradiation can be enhanced even more.

In this case, as a specific method for setting the central luminous intensity position M of the additional light distribution pattern P(H1) for a high beam into a position shifted toward the opposed lane side with respect to the H–V, it is preferable that the direction of the optical axis Ax1 of the reflector 22 of the lighting unit 16 for a high beam should be slightly shifted toward the opposed lane side in the forward direction, for example.

Next, a second embodiment of the invention will be described.

Figure 6:
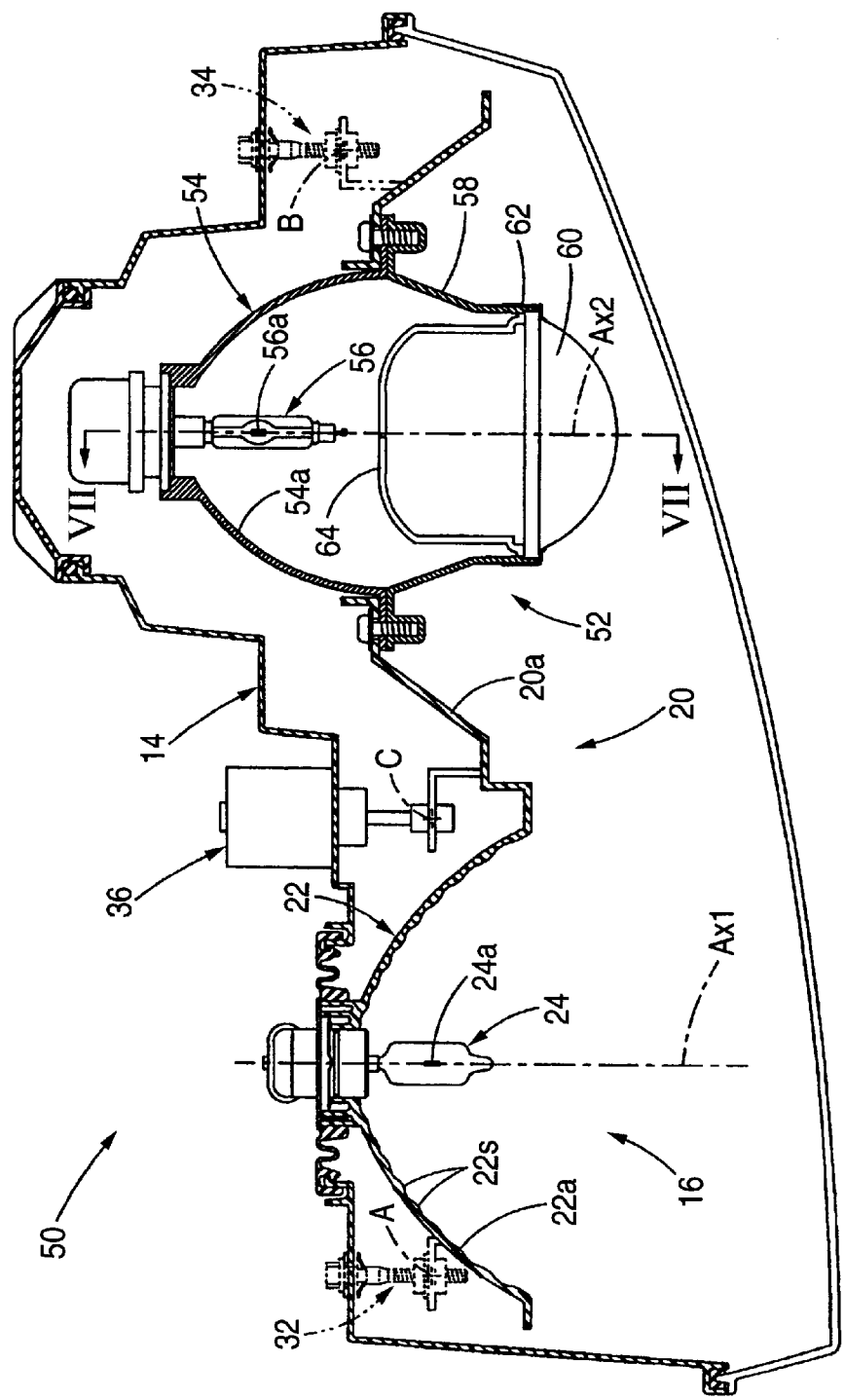
FIG. 6 is a sectional plan view showing a headlamp for a vehicle according to a second embodiment of the invention.
Figure 7:
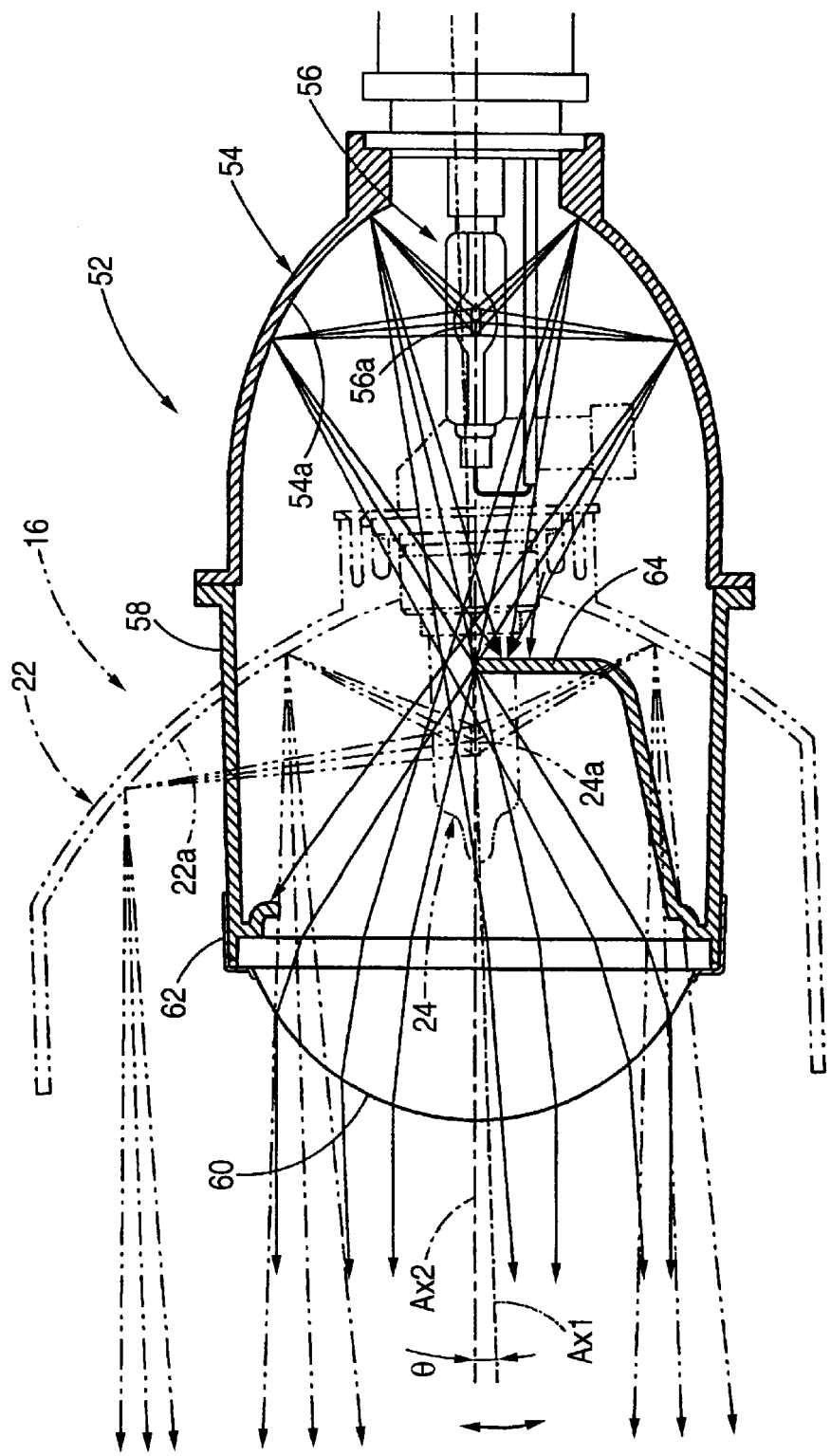
FIG. 7 is a sectional view taken along a line VII—VII in FIG. 6, FIGS. 8(a) and 8(b) are views showing the function of the second embodiment in the same manner as FIG. 4.

FIG. 6 is a sectional plan view showing a headlamp for a vehicle according to a second embodiment of the invention and FIG. 7 is a sectional view taken along a line VII—VII.

As shown in these drawings, in a headlamp 50 for a vehicle according to the second embodiment, the lighting unit 52 for a low beam is different from the lighting unit 18 of the first embodiment, while other structure remains the same as in the first embodiment.

More specifically, a lighting unit 16 for a high beam and a lighting unit 52 for a low beam are tiltably provided as one tilting unit 20, and low beam irradiation is carried out by turning on the lighting unit 52 for a low beam and high beam irradiation is carried out by simultaneously turning on both of the lighting units 16 and 52.

The lighting unit 52 for a low beam is of a projector type and comprises a reflector 54 having an optical axis Ax2 extended in the longitudinal direction of a vehicle, a discharge bulb 56 having a discharge light emitting portion 56a (a light source), a holder 58, a projection lens 60, a retaining ring 62 and a shade 64.

The discharge bulb 56 is attached to the reflector 54 such that the discharge light emitting portion 56a (a light source) is positioned on the optical axis Ax2 extended in the longitudinal direction of the vehicle. The reflector 54 has a reflecting plane 54a taking the shape of a deformed elliptical sphere setting the optical axis Ax2 to be a center axis, and serves to reflect a light transmitted from the discharge light emitting portion 56a forward close to the optical axis Ax2. The holder 58 is formed cylindrically to be extended forward from an opening portion on the front end of the reflector 54 and has a rear end fixed to the reflector 54 through a tilting unit panel 20a with a screw and a front end fixing and supporting the projection lens 60 through the retaining ring 62. The projection lens 60 is formed by a plane convex non-spherical lens and a light reflected by the reflector 54 is collected close to the optical axis Ax2. The shade 64 is formed integrally with the holder 58 such that an upper edge is positioned on the focal point of the projection lens 60 and a part of the light reflected by the reflector 54 is shielded. Consequently, an upward irradiated light emitted from the lighting unit 52 for a low beam is removed.

Figure 8:
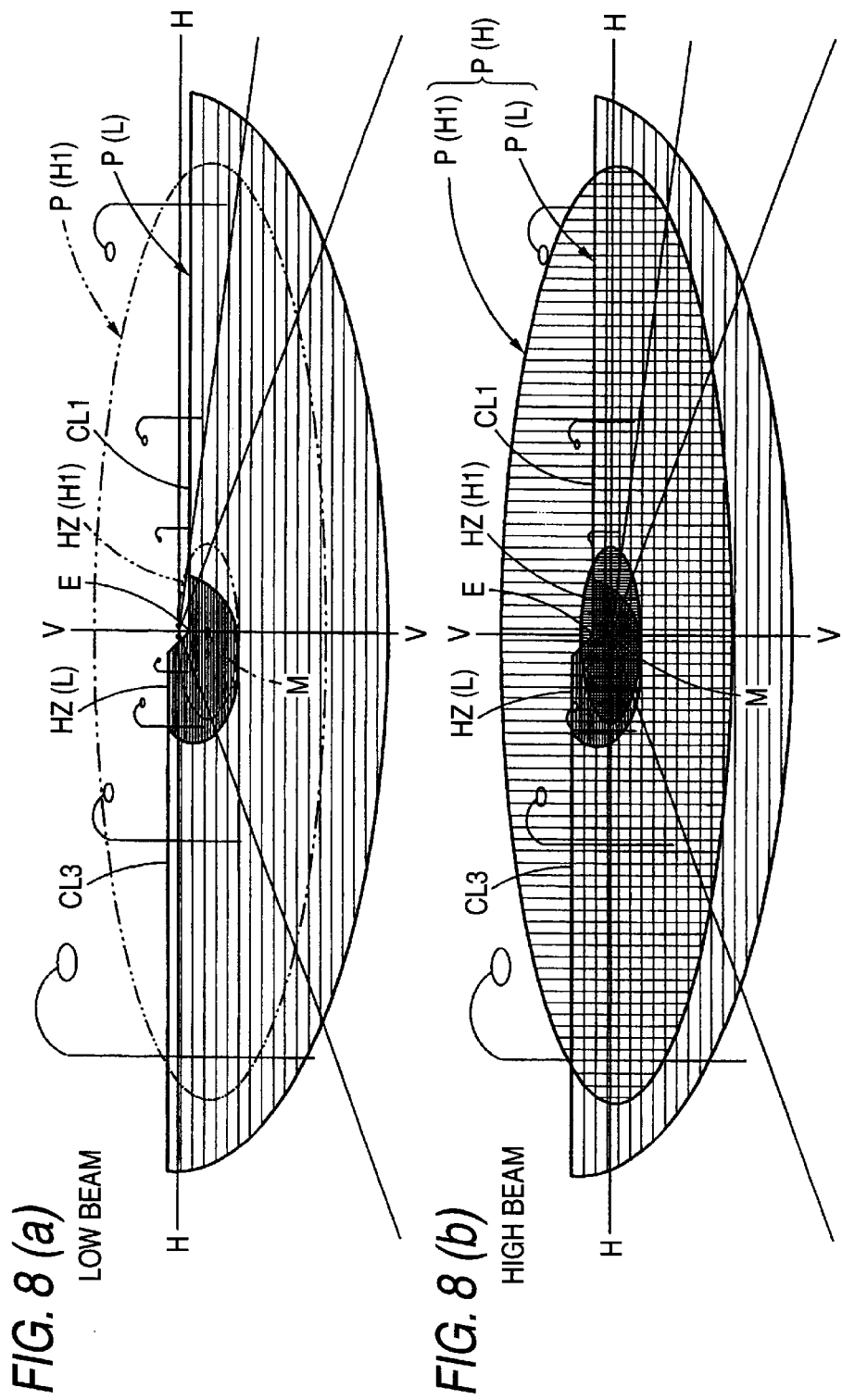

FIG. 8 is a perspective view showing a light distribution pattern formed on a virtual vertical screen provided in a position placed ahead of the lighting by 25 m through the beam irradiation from the headlamp 50 for a vehicle according to the second embodiment.

Also in the second embodiment, in the same manner as in the first embodiment, a light distribution pattern P(L) for a low beam shown in FIG. 8(a) is formed by the beam irradiation from the lighting unit 52 for a low beam during the low beam irradiation, while a light distribution pattern P(H) for a high beam in which an additional light distribution pattern P(H1) for a high beam is superposed on the light distribution pattern P(L) for a low beam as shown in FIG. 8(b) is formed by the beam irradiation from both of the lighting units 16 and 52 during the high beam irradiation. Moreover, the second embodiment is the same as the first embodiment in that the tilting unit 20 is tilted upward by approximately 1.5 degrees at the time of the high beam irradiation as compared with the time of the low beam irradiation so that the light distribution pattern P(L) for a low beam is displaced upward.

As shown in FIG. 8(a), the light distribution pattern P(L) for a low beam has a horizontal cutoff line CL1 on the opposed lane side in a lighting front direction (H–V), and furthermore, has a stepped cutoff line CL3 stepped toward the self-lane side and extended in a horizontal direction. A hot zone HZ(L) is formed on a region in the vicinity of the lower left part of an intersection (an elbow point) E of the horizontal cutoff line CL1 and the stepped cutoff line CL3. The light distribution pattern P(L) for a low beam has the elbow point E positioned below H–V by 0.5 to 0.6 degrees during the low beam irradiation.

While the light distribution pattern P(L) for a low beam is displaced upward by approximately 1.5 degrees through the upward tilt of the tilting unit 20 during the high beam irradiation as shown in FIG. 8(b), the hot zone HZ(L) is also displaced upward to a height which is almost equal to an H–H line (a horizontal line passing through the H–V) by the upward displacement.

On the other hand, the additional light distribution pattern P(H1) for a high beam has a central luminous intensity position M set to the H–V and a hot zone HZ(H1) is formed around the H–V as shown in FIG. 8(b). The additional light distribution pattern P(H) for a high beam is not formed during the low beam irradiation. If the additional light distribution pattern P(H) is formed, the central luminous intensity position M is positioned below the H–V by approximately 1.5 degrees as shown in a two-dotted chain line of FIG. 8(a).

As described above in detail, also in the second embodiment, when the tilting unit 20 is tilted upward by approximately 1.5 degrees at the time of the high beam irradiation as compared with the time of the low beam irradiation, the light distribution pattern P(L) for a low beam can be displaced upward by approximately 1.5 degrees. Therefore, the hot zone HZ(L) can be moved to the long distance region of the road placed ahead of the vehicle. Consequently, a distance visibility in the high beam irradiation can be enhanced.

On the other hand, the central luminous intensity position M of the additional light distribution pattern P(H1) for a high beam is set to be lower by approximately 1 degree from the horizontal cutoff line CL1 of the light distribution pattern P(L) for a low beam. Therefore, when the tilting unit 20 is tilted upward by approximately 1.5 degrees at time of the high beam irradiation as compared with time of the low beam irradiation, the central luminous intensity position M of the additional light distribution pattern P(H1) for a high beam can be set suitably for enhancing the distance visibility (that is, a height which is almost equal to the H–H line).

Also in the headlamp 50 for a vehicle according to the second embodiment, a filament 24a of a halogen bulb 24 is used for the light source of the lighting unit 16 for a high beam and a discharge light emitting portion 56a of a discharge bulb 56 is used for the light source of the lighting unit 52 for a low beam. Therefore, it is particularly effective when the light distribution pattern P(L) for a low beam is displaced upward during the high beam irradiation.

Figure 9:
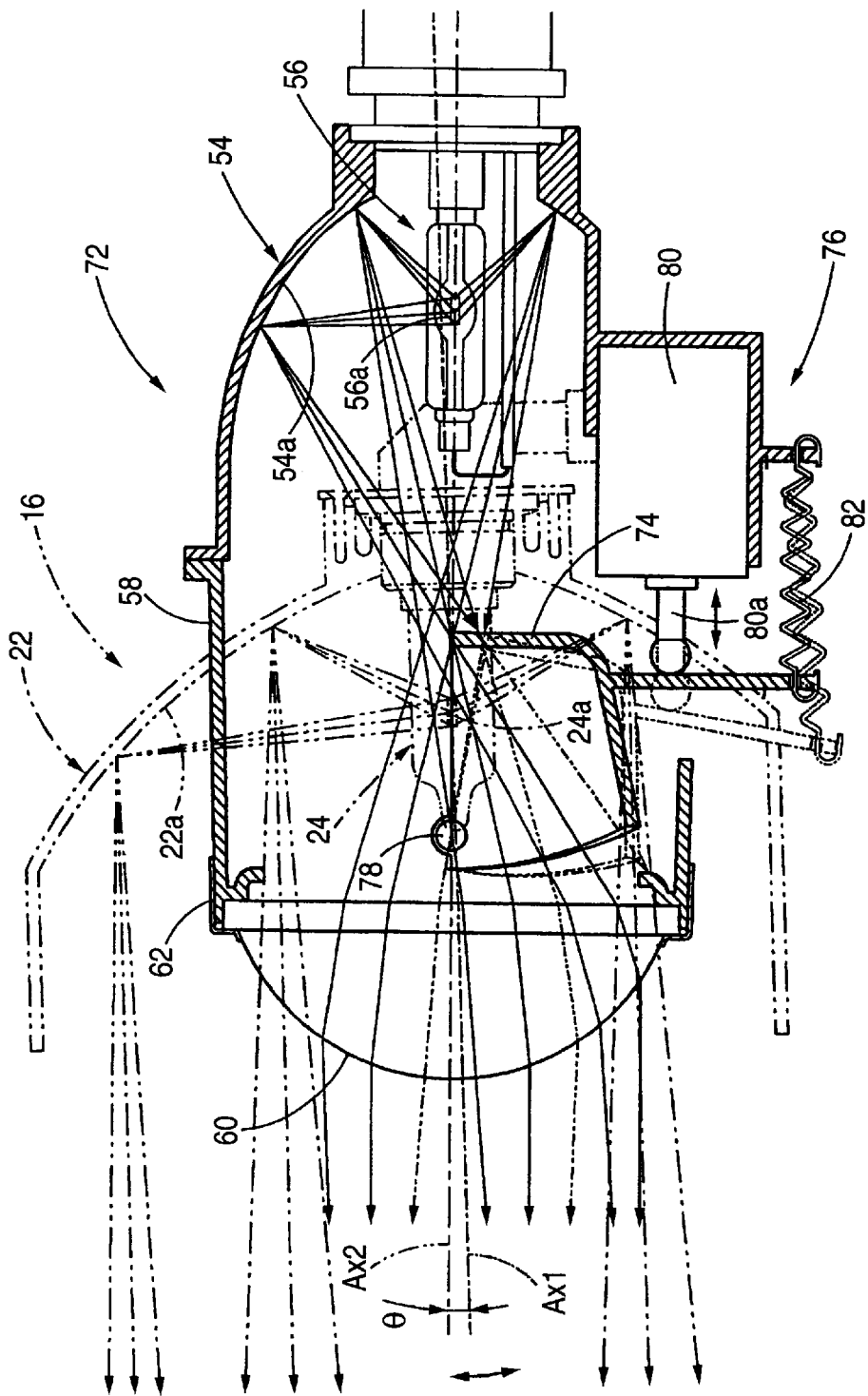
FIG. 9 is a view showing a variant of the second embodiment in the same manner as FIG. 7, FIGS. 10(a) and 10(b) are views showing the function of the second of the variant embodiment in the same manner as FIG. 4, and FIGS. 11(a) and 11(b) are views showing the function of a conventional example in the same manner as FIG. 4.

FIG. 9 is a view showing a variant of the second embodiment in the same manner as FIG. 7.

As shown in FIG. 9, the variant is different from the second embodiment in that a lighting unit 72 for a low beam comprising a movable shade 74 and a shade driving device 76 is used for a lighting unit for a low beam, and the other structures are the same as those in the second embodiment.

The movable shade 74 is supported on a holder 58 rotatably in a longitudinal direction through a pair of left and right pins 78 and can take a low beam constituting position (a position shown in a solid line of the drawing) in which a part of a light reflected by a reflector 54 is shielded and a high beam constituting position (a position shown in a two-dotted chain line of the drawing) in which the shielding is released.

The rotation of the movable shade 58 is carried out by the shade driving device 76. The shade driving device 76 comprises a solenoid 80 and a return spring 82. The solenoid 80 is fixed to the lower part of the reflector 54 such that the tip portion of a plunger 80a abuts on the movable shade 58, and the plunger 80a is protruded by excitation up to a position shown in a two-dotted chain line of the drawing. Moreover, the return spring 82 serves to energize the plunger 80a toward a non-excitation position. By controlling the driving operation of the shade driving device 76, the movable shade 74 is rotated into the low beam constituting position during low beam irradiation and is rotated into the high beam constituting position during high beam irradiation.

FIG. 10 is a perspective view showing a light distribution pattern formed on a virtual vertical screen provided in a position placed ahead of the lighting by 25 m through the beam irradiation from the headlamp for a vehicle according to the variant.

Also in the variant, in the same manner as in the second embodiment, a light distribution pattern P(L) for a low beam as shown in FIG. 10(a) is formed by the beam irradiation from the lighting unit 72 for a low beam during the low beam irradiation, while a light distribution pattern P(H) for a high beam in which an additional light distribution pattern P(H1) for a high beam is superposed on a light distribution pattern P(H2) for a high beam shown in FIG. 10(b) is formed by the beam irradiation from both of the lighting units 16 and 52 during the high beam irradiation.

Referring to the light distribution pattern (H2) for a high beam, the shielding for the light reflected by the reflector 54 is released by the rotation of the movable shade 74 into the high beam constituting position so that an irradiated light is expanded above a horizontal cutoff line CL1 and a stepped cutoff line CL3 with respect to the light distribution pattern P(L) for a low beam.

Also in the variant, when a tilting unit 20 is tilted upward by approximately 1.5 degrees at the time of the high beam irradiation as compared with the time of the low beam irradiation, the light distribution pattern P(L) for a low beam is changed to the light distribution pattern P(H2) for a high beam and is simultaneously displaced upward by approximately 1.5 degrees. Therefore, a hot zone HZ(H2) can be moved to a long distance region in a road placed ahead of a vehicle. Consequently, a distance visibility in the high beam irradiation can be enhanced.

In the variant, particularly, the light distribution pattern P(H) for a high beam is formed as a synthesized light distribution pattern of the light distribution pattern P(H2) for a high beam having an upward expansion with respect to the light distribution pattern P(L) for a low beam and the additional light distribution pattern P(H1) for a high beam. Therefore, the distance visibility in the high beam irradiation can be enhanced even more.

Although the invention has been described in its preferred embodiments, it is understood that the invention is not limited to the specific above-described embodiments. It is contemplated that numerous modifications maybe made to the present invention without departing from the spirit and scope of the invention as defined in the claims.

What is claimed is:

1. A headlamp for a vehicle comprising:
a lighting unit for a high beam and a lighting unit for a low beam tiltably provided as one tilting unit, wherein low beam irradiation is performed by turning on the lighting unit for a low beam and high beam irradiation is performed by simultaneously turning on both of the lighting units,
the lighting unit for a high beam set such that a central luminous intensity position of a light distribution pattern formed by the beam irradiation from the lighting unit for a high beam is lower than a horizontal cutoff line on an opposed lane side in a light distribution pattern for a low beam which is formed by the beam irradiation from the lighting unit for a low beam, and wherein the tilting unit is operable to be tilted upward at a predetermined angle at the time of the high beam irradiation.

2. The headlamp for a vehicle according to claim 1, wherein a light source of the lighting unit for a high beam comprises a filament of an incandescent bulb, and a light source of the lighting unit for a low beam comprises a discharge light emitting portion of a discharge bulb.

3. The headlamp for a vehicle according to claim 1, wherein the central luminous intensity position of the light distribution pattern formed by the beam irradiation from the lighting unit for a high beam is set to be shifted by a predetermined amount toward the opposed lane side in a forward direction of the lighting unit for a high beam.

4. The headlamp for a vehicle according to claim 2, wherein the central luminous intensity position of the light distribution pattern formed by the beam irradiation from the lighting unit for a high beam is set to be shifted by a predetermined amount toward the opposed lane side in a forward direction of the lighting unit for a high beam.

5. The headlamp for a vehicle according to claim 1, wherein the tilting unit is tilted by a leveling mechanism.

6. The headlamp for a vehicle according to claim 1, wherein said lighting unit for a low beam is comprised of a movable shade and a shade driving device by which the movable shade is moved to a low beam constituting position during low beam irradiation, and a high beam constituting position during high beam irradiation.

7. A method for headlamp illumination comprising setting a central luminous intensity position of a light distribution pattern formed by a first beam lower than a horizontal cutoff line on an opposed lane side in a light distribution pattern formed by a second beam.

8. The method for headlamp illumination according to claim 7 wherein the first beam is formed by a lighting unit for a high beam and the second beam is formed by a lighting unit for a low beam.

9. The method for headlamp illumination according to claim 8, further comprising tilting both the lighting unit for a high beam and the lighting unit for a low beam upward at a predetermined angle at the time of a high beam irradiation.

10. The method for headlamp illumination according to claim 8, further comprising shifting the central luminous intensity position of the light distribution pattern formed by the beam from the lighting unit for a high beam by a predetermined amount toward the opposed lane side in a forward direction of the lighting unit for a high beam.

11. The method for headlamp illumination according to claim 9, wherein said tilting is performed by a leveling mechanism.

12. The method for headlamp illumination according to claim 8, wherein a movable shade and a shade driving device used therefor are provided in the lighting unit for a low beam, and the second beam is formed by moving the movable shade to a low beam constituting position during low beam irradiation, and a high beam constituting position during high beam irradiation.

* * * * *